United States Patent
Kurokawa et al.

(10) Patent No.: US 9,215,576 B2
(45) Date of Patent: Dec. 15, 2015

(54) COMMUNICATION SYSTEM, FEMTO BASE STATION, CALL SESSION CONTROL SERVER, HOME SUBSCRIBER SERVER, COMMUNICATION METHOD, AND PROGRAM

(75) Inventors: Osamu Kurokawa, Tokyo (JP); Kazuki Eguchi, Tokyo (JP); Naoki Yoshida, Tokyo (JP); Shunsuke Yokouchi, Tokyo (JP); Yasuhiro Watanabe, Tokyo (JP); Hiroaki Akiyama, Tokyo (JP); Takuo Akimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 678 days.

(21) Appl. No.: 13/133,106

(22) PCT Filed: Dec. 21, 2009

(86) PCT No.: PCT/JP2009/071250
§ 371 (c)(1),
(2), (4) Date: Jul. 21, 2011

(87) PCT Pub. No.: WO2010/074034
PCT Pub. Date: Jul. 1, 2010

(65) Prior Publication Data
US 2011/0269420 A1 Nov. 3, 2011

(30) Foreign Application Priority Data
Dec. 26, 2008 (JP) .................................. 2008-333646

(51) Int. Cl.
*H04M 11/04* (2006.01)
*H04W 80/10* (2009.01)
(Continued)

(52) U.S. Cl.
CPC .. *H04W 4/22* (2013.01); *G01S 5/02* (2013.01); *H04W 76/007* (2013.01); *H04W 4/02* (2013.01);
(Continued)

(58) Field of Classification Search
USPC ........ 455/404.1–404.2, 414.1, 444, 446, 448, 455/466
See application file for complete search history.

(56) References Cited

U.S. PATENT DOCUMENTS 7,411,940 B2 * 8/2008 Gass .............................. 370/352
2005/0144647 A1 6/2005 Zussman et al.
(Continued)

FOREIGN PATENT DOCUMENTS

CN 1728879 A 2/2006
CN 101043748 A 9/2007
(Continued)

OTHER PUBLICATIONS

International Search Report for PCT/JP2009/071250 mailed Mar. 16, 2010.
(Continued)

*Primary Examiner* — Anthony Addy
*Assistant Examiner* — Matthew Genack

(57) ABSTRACT

A communication system of the present invention is a communication system connected to a public communication network including emergency organization communication apparatus (14), the communication system includes femto base station (2) wirelessly connected to wireless terminal (1), wherein femto base station (2) includes a first communication controller that attaches first location information, which is information for identifying a location of femto base station (2) or for identifying a location of an assembly of a plurality of base stations including femto base station (2), to a SIP message in order to notify the first location information to emergency organization communication apparatus (14) when there is a call from wireless terminal (1), and transmits the SIP message to another apparatus.

10 Claims, 8 Drawing Sheets

(51) Int. Cl.
*H04W 4/22* (2009.01)
*G01S 5/02* (2010.01)
*H04W 76/00* (2009.01)
*H04W 4/02* (2009.01)
*H04W 24/10* (2009.01)
*H04W 28/06* (2009.01)
*H04W 64/00* (2009.01)
*H04W 68/00* (2009.01)
*H04W 84/04* (2009.01)

(52) U.S. Cl.
CPC ............... *H04W 24/10* (2013.01); *H04W 28/06* (2013.01); *H04W 64/00* (2013.01); *H04W 68/00* (2013.01); *H04W 84/045* (2013.01)

(56) References Cited

U.S. PATENT DOCUMENTS

| | | | |
|---|---|---|---|
| 2005/0233727 | A1 | 10/2005 | Poikselka et al. |
| 2008/0108319 | A1 | 5/2008 | Gallagher |
| 2008/0305784 | A1* | 12/2008 | Dillinger et al. ............. 455/418 |
| 2009/0311987 | A1* | 12/2009 | Edge et al. ................. 455/404.1 |
| 2010/0159945 | A1* | 6/2010 | Brisebois ................... 455/456.1 |
| 2010/0178896 | A1* | 7/2010 | Terrero Diaz-Chiron et al. ............................ 455/405 |

FOREIGN PATENT DOCUMENTS

| | | |
|---|---|---|
| CN | 101227648 A | 7/2008 |
| JP | 2004-502387 A | 1/2004 |
| JP | 2007-511185 A | 4/2007 |
| JP | 2008289176 A | 11/2008 |
| JP | 2008294843 A | 12/2008 |
| WO | 2005/112488 A2 | 11/2005 |
| WO | 2007124987 A | 11/2007 |

OTHER PUBLICATIONS

Chinese Office Action for CN Application No. 200980152952.2 issued on Jun. 5, 2013 with English Translation.

Chinese Office Action for CN Application No. 200980152952.2 issued on Nov. 5, 2013 with English Translation.

M. Aso et al., "Kinkyu Tsuho Hasshin Ji ni Okeru Ichi Joho Tsuuchi Kino no Kaihatsu (Develpment for Function of Notifying Location Information During Emergency Call)", NTT DoCoMo Technical Journal, vol. 15, No. 1, pp. 34-39, Apr. 2007 with English abstract. See cited doc. on p. 2 of translated International Search Report for explanation of relevance.

Supplementary Partial European Search Report of EP Application No. 09834835 dated Aug. 19, 2015.

\* cited by examiner

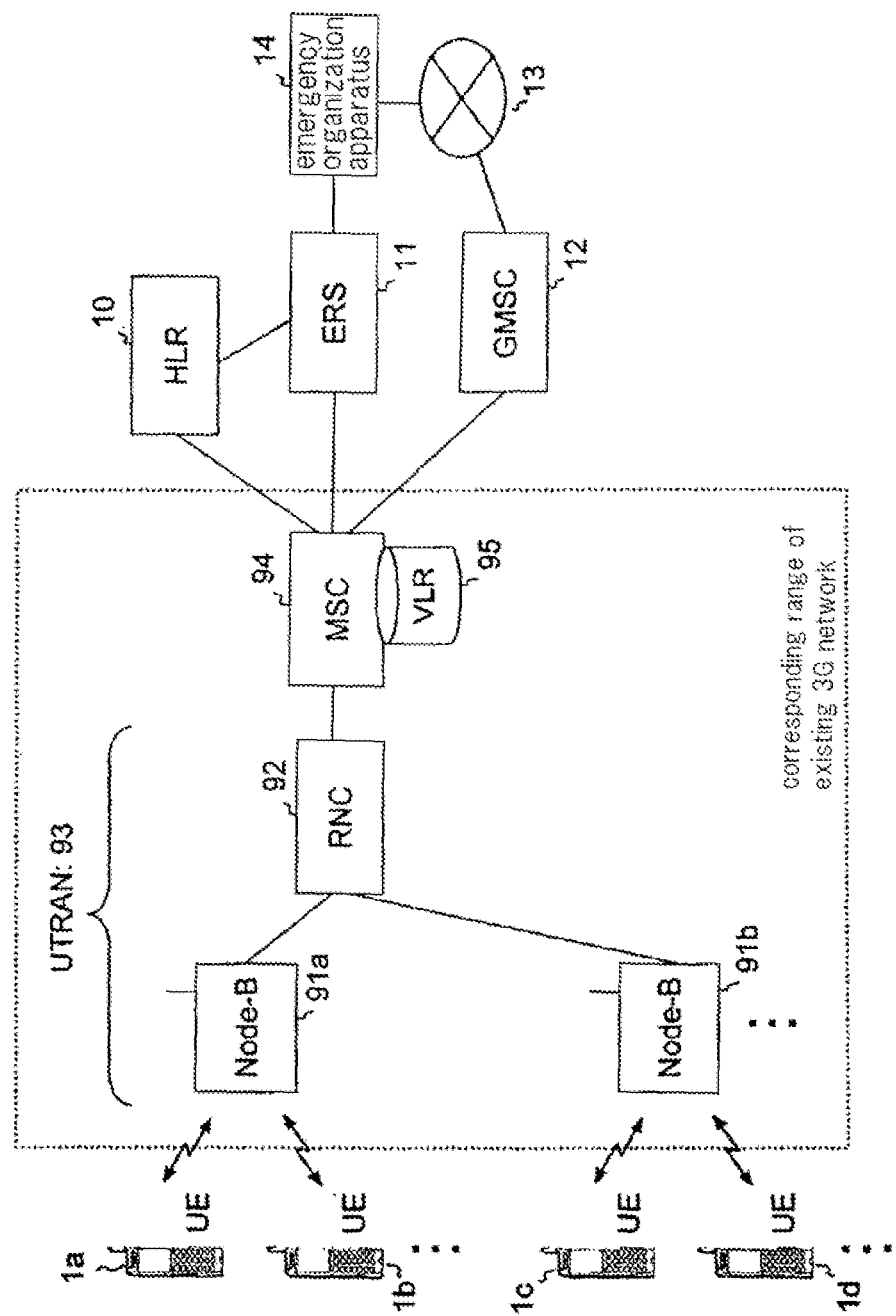

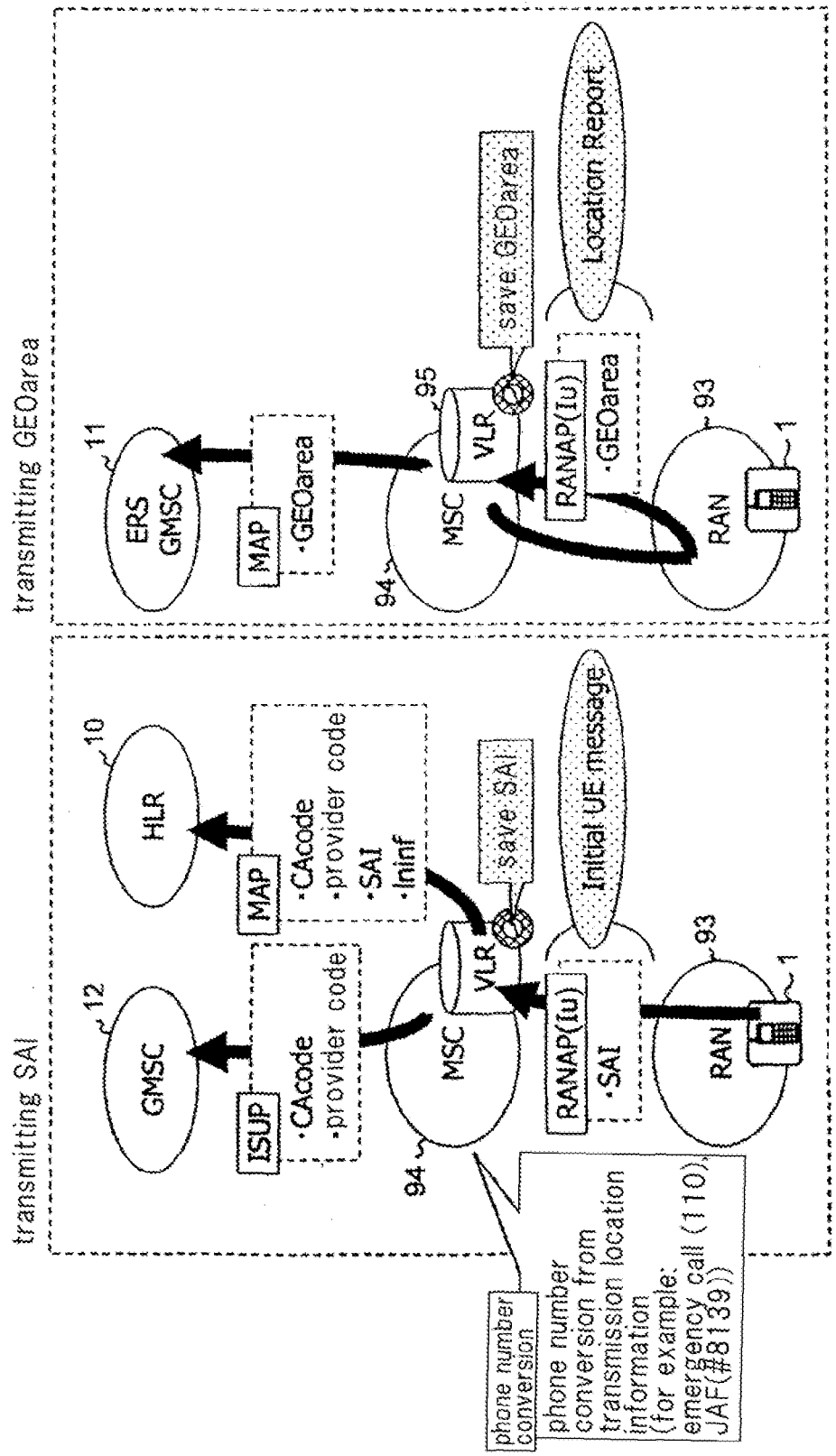

Fig.3

```
SAI
┌─────────────────────────┐
│ 440  20  XXXX  YYYY     │
│ ────  ──  ────  ────    │
│ MCC  MNC  LAC   SAC     │
└─────────────────────────┘
```

Fig.4

```
┌─GEOarea──────────────────────────────────────────────────┐
│  locationEstimate             : 850b303156a560978136362d43│
│  +-Ext-GeographicalInformation : 850b303156a560978136362d43│
│     +-type of Shape            = 3 : Ellipsoid point with │
│                                      uncertainty Ellipse  │
│     +-sign of latitude         = 0 : North                │
│     +-degrees of latitude      = 0x3156a5 : 34            │
│     +-degrees of longitude     = 0x609781 : 135           │
│     +-uncertainty semi-major   = 0x36 : 1 km              │
│     +-uncertainty semi-minor   = 0x36 : 1 km              │
│     +-orientation              = 45 : 45 degrees          │
│     +-confidence               = 67 : 67 %                │
└──────────────────────────────────────────────────────────┘
```

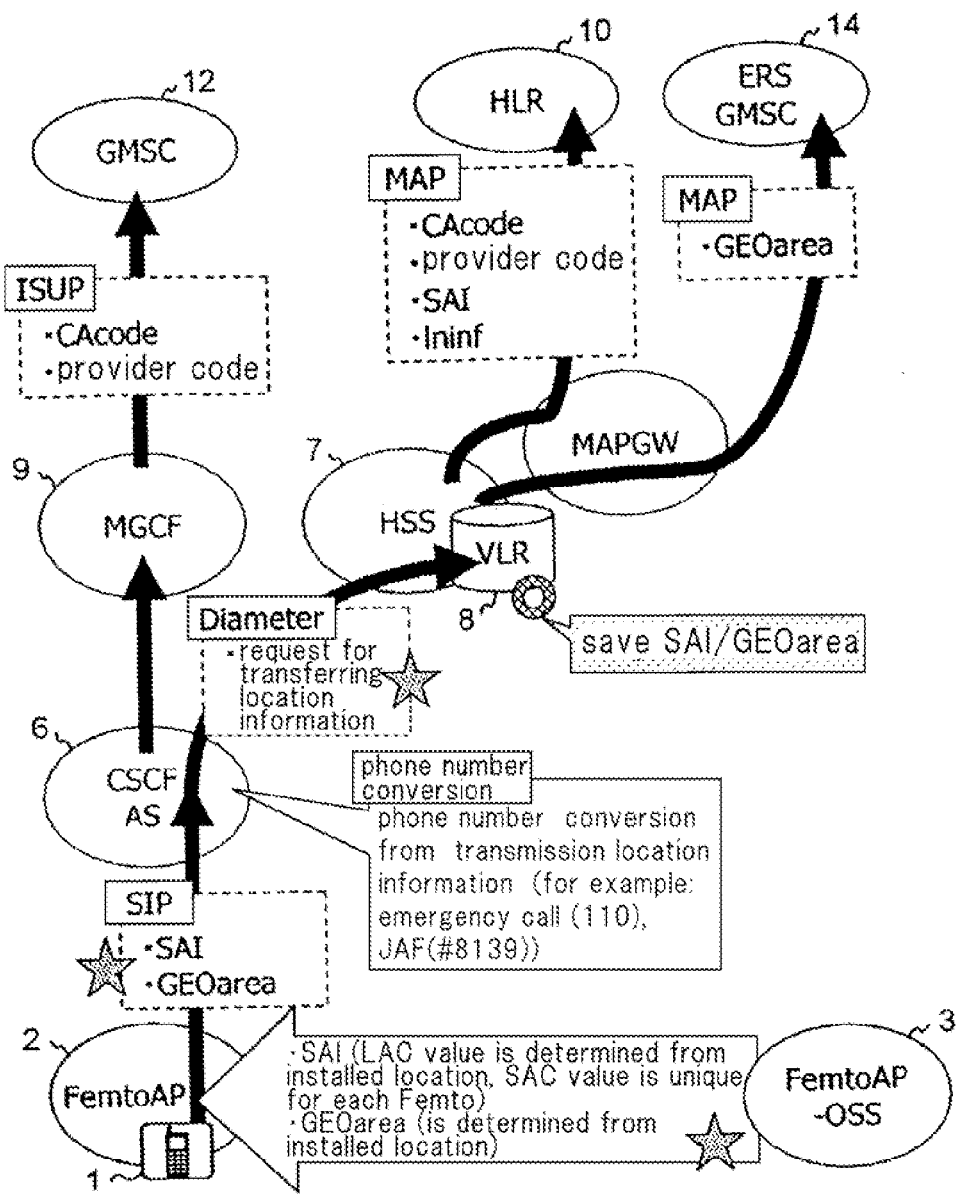

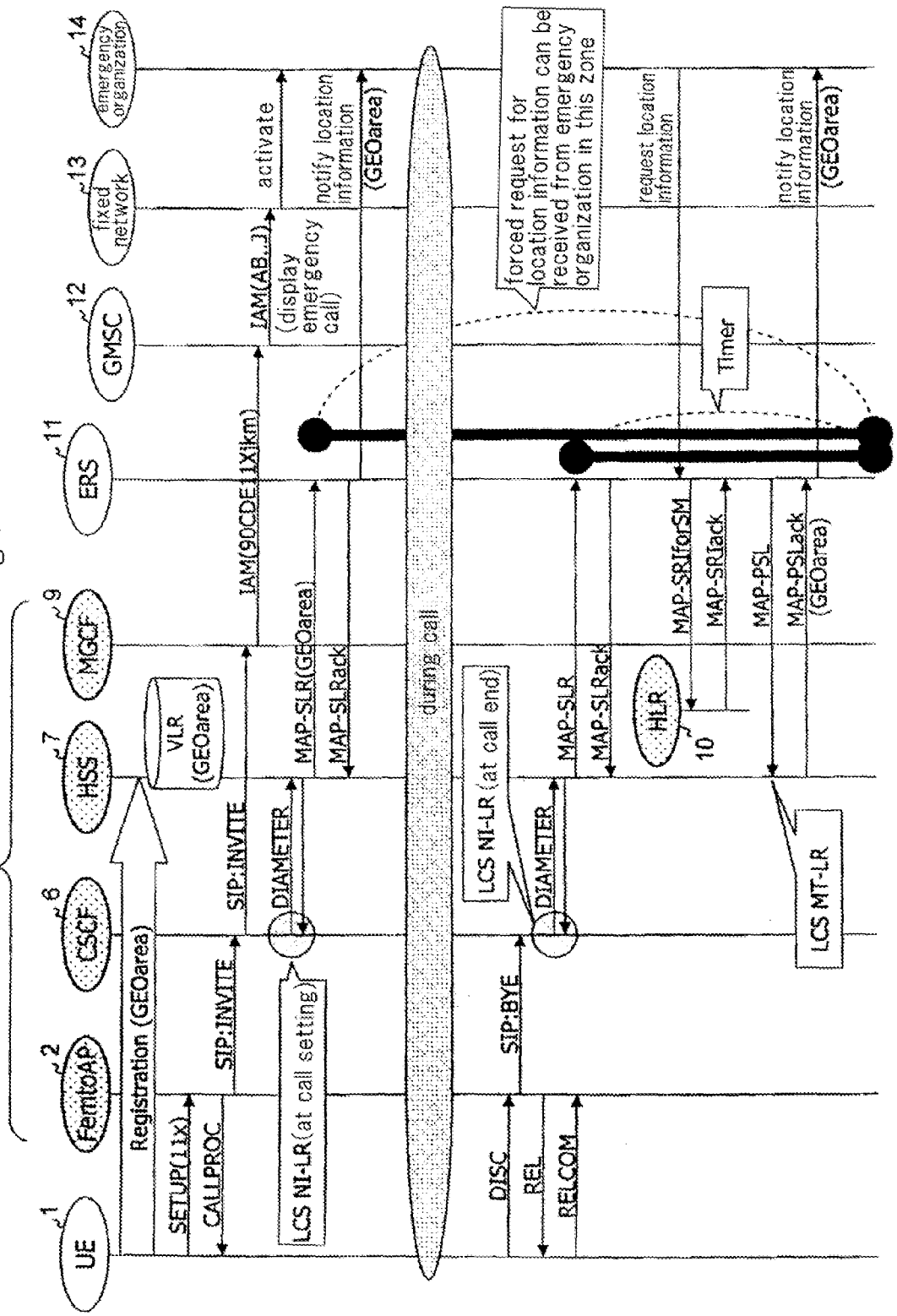

COMMUNICATION SYSTEM, FEMTO BASE STATION, CALL SESSION CONTROL SERVER, HOME SUBSCRIBER SERVER, COMMUNICATION METHOD, AND PROGRAM

TECHNICAL FIELD

The present invention relates to a communication system, a femto base station, a call session control server, a home subscriber server, a communication method, and a program for a femto cell to connect an incoming call from a wireless terminal, including a call to an emergency organization communication apparatus.

BACKGROUND ART

In general, there is a public mobile communication network for connecting an incoming call from a wireless terminal (UE; user equipment) to another terminal or device.

In such a communication system, so-called phone number conversion is performed during a call for an emergency organization, etc., for converting the phone number of an emergency call, such as a police telephone number 110 or a fire department telephone number 119, into a phone number of emergency organization allocated in advance in accordance with current location information of a wireless terminal which is a caller.

In the call for emergency organization, detailed location information, such as latitude/longitude information of a wireless terminal which is a caller, is notified to an emergency organization communication apparatus of a called party.

A 3G (third generation: third generation mobile communication) network will be described as an example of an existing public mobile communication network for connecting UE, such as a cell phone, to another terminal or device.

As shown in FIG. 1, a system based on an existing 3G network is connected to HLR (Home Location Register) 10 used in an IMS (IP Multimedia subsystem) network, emergency organization server (ERS; Emergency Register Server) 11 for notifying location information to emergency organization communication apparatus (described as emergency organization apparatus in FIG. 1) 14, and GMSC (Gateway Mobile Switching Center) 12 as a gateway for connecting the system based on the existing 3G network to fixed network (PSTN; Public Switched Telephone Network) 13 as an example of a public communication network.

The system based on the existing 3G network houses UE 1 to be connected for communication and connects UE 1 to one from among HLR 10, ERS 11, and GMSC 12 described above. The system based on the existing 3G network includes UTRAN (UMTS Terrestrial Radio Access Network) 93 by Node-B 91 and RNC 92 and MSC (Mobile Switching Center) 94 comprising VLR 95.

UE, Node-B, RNC, MSC, VLR, HLR, and GMSC in the existing 3G network are apparatuses that execute processes compliant with 3GPP (3rd Generation Partnership Project), and the description of specific functions and processing operations will be omitted.

Next, a flow of location information transmission used for a call to an emergency organization communication apparatus, etc., in the existing 3G network will be described with reference to FIG. 2.

When there is a call from UE 1, RAN (Radio Access Network) 93, such as ULTRAN, transmits SAI (Service Area Identification), which is information for identifying the location of Node-B that houses UE 1 of the caller by wireless communication or for identifying the location of an assembly of base stations including the Node-B, to MSC 94 by using a RANAP (Radio Access Network Application Part) message. Hereinafter, SAI will be referred to as first location information.

SAI (first location information) denotes values predetermined by a system operator and is defined in a format including parameters MCC (Mobile Country Code), MNC (Mobile Network Code), LAC (Location Area Code), and SAC (Service Area Code) as illustrated in FIG. 3.

Receiving SAI, MSC 94 stores SAI in VLR 95 in association with base station identification information as information for identifying the base station connected with the caller and transmits SAI to HLR 10 by using a MAP (Mobile Application Part) message.

MSC 94 performs so-called phone number conversion for converting a predetermined phone number, such as an emergency telephone number 110 or 119, into a phone number allocated in advance in accordance with current location information of caller UE 1. If the phone number transmitted from UE 1 is included in target phone numbers for the phone number conversion, the phone number is converted into a called party's phone number by phone number conversion, and the call is connected to the converted called party's phone number.

UE 1 transfers GEOarea (Geographical Area) including latitude/longitude information of UE 1 to RAN 93, and RAN 93 transmits GEOarea to MSC 94 by using a RANAP message. MSC 94 stores GEOarea in VLR 95, and if the called party of UE 1 is an emergency organization communication apparatus, transmits GEOarea to ERS 11 along with a MAP message. Hereinafter, GEOarea will be referred to as second location information.

GEOarea (second location information) is defined in a format as illustrated in FIG. 4 and denotes location information including latitude/longitude information of a sender apparatus.

Next, an operation of UE 1 calling an emergency organization communication apparatus in the existing 3G network will be described with reference to FIG. 5.

UE 1 first transfers a connection request (SETUP) to RAN 93. When receiving the message of SETUP from RAN 93, MSC 94 transmits CALLPROC as a reply to UE 1 and transmits an IAM message to GMSC 12. In this way, call control is performed for emergency organization communication apparatus 14 through fixed network 13.

MSC 94 transmits a location measurement request to UTRAN 93 by using a RANAP message to cause UE 1 to measure location information including latitude/longitude information. When receiving the location information from UE 1, Node-B 91 transmits GEOarea to MSC 94. When receiving GEOarea from Node-B 91, MSC 94 transmits GEOarea to ERS 11 by using a MAP message. ERS 11 transmits GEOarea received from MSC 94 to emergency organization communication apparatus 14. This allows a call between UE 1 and emergency organization communication apparatus 14.

When the end of the call (DISC; Disconnect) is received from UE 1, MSC 94 notifies the end of the call to ERS 11 by using a MAP message.

After the end of the call, if emergency organization communication apparatus 14 transmits a location information request to ERS 11 before the elapse of time predetermined by Timer of ERS 11, ERS 11 inquires of HLR 10 for an acquisition location for acquiring location information of requested UE by using a MAP message. ERS 11 identifies the acquisition location based on a reply to the inquiry and transmits, by using a MAP message, the location information request to MSC 94 identified as the acquisition location. When receiving the location information request from ERS 11, MSC 94 causes UE 1 to perform location measurement by using a RANAP message.

In this way, the system based on the existing 3G network causes UE 1 to measure the location information including the latitude/longitude information, and when MSC 94 receives GEOarea transmitted from Node-B 91, transmits, by using a MAP message, GEOarea received by MSC 94 to emergency organization communication apparatus 14 through ERS 11.

Meanwhile, in a technique related to the present invention, a radio network controller (RNC) acquires specific information that is information specific to a wireless transmit/receive unit (WTRU) and transfers the specific information to a Node, such as a wireless base station, to allow the Node that has received the information to use the specific information. An example is disclosed in National Publication of International Patent Application No. 2007-511185 (hereinafter, called Patent Document 1).

In recent years, the possibility of a technique called a femto cell that is connected to a mobile communication core network through a wired line installed at home or office has attracted attention.

In the femto cell, a femto base station (Femto AP) that covers a narrow communication area of about several dozen meters in radius wirelessly connects to UE to connect UE to a mobile communication core network, and the femto cell mainly covers an indoor communication area such as in a house or office. This allows covering the communication area without spending much money on the infrastructure development of an existing macro cell base station.

SUMMARY OF INVENTION

However, in an existing public mobile communication network as in Patent Document 1, a configuration in which a femto cell is installed is not taken into consideration.

Therefore, a configuration in which a femto base station is used to make a call to an emergency organization based on location information is not taken into consideration either.

An object of the present invention is to provide a communication system, a femto base station, a call session control server, a home subscriber server, a communication method, and a communication program for using a femto base station to handle a call to an emergency organization communication apparatus.

A femto base station according to an exemplary aspect of the invention is a femto base station arranged in a communication system connected to a public communication network including an emergency organization communication apparatus, the femto base station comprising: a storage that stores first location information which is information for identifying a location of the femto base station or for identifying a location of an assembly of a plurality of base stations including the femto base station; and a communication controller that attaches the first location information to a SIP message in order to notify the first location information to the emergency organization communication apparatus when there is a call from the wireless terminal, and that transmits the SIP message to another apparatus.

A call session control server according to an exemplary aspect of the invention is a call session control server arranged in a communication system connected to a public communication network including an emergency organization communication apparatus, the call session control server comprising: a conversion table associating a predetermined phone number with a predetermined called party's phone number in accordance with first location information which is information for identifying a location of a femto base station arranged in the communication system, the femto base station wirelessly communicating with a wireless terminal, or for identifying a location of an assembly of a plurality of base stations including the femto base station; and a communication controller that receives a SIP INVITE message including the first location information from the femto base station, converts a phone number included in the SIP INVITE message into the called party's phone number based on the conversion table if the phone number is included in the conversion table, and transmits the converted called party's phone number to a media gateway control server arranged in the communication system by using a SIP INVITE message.

A home subscriber server according to an exemplary aspect of the invention is a home subscriber server arranged in a communication system connected to a public communication network including an emergency organization communication apparatus, the home subscriber server comprising: a visitor location register that stores second location information, which is information including longitude/latitude information of a wireless terminal, in association with base station identification information, which is information for identifying a femto base station connected to the wireless terminal; and a communication controller that stores the second location information, which is received during authentication of the wireless terminal from the femto base station connected to the wireless terminal, in the visitor location register in association with the base station identification information.

A communication method according to an exemplary aspect of the invention is a communication method in a communication system that is connected to a public communication network including an emergency organization communication apparatus and that includes a femto base station, the communication method comprising: the femto base station attaching first location information, which is information for identifying a location of the femto base station or for identifying a location of an assembly of a plurality of base stations including the femto base station, to a SIP message in order to notify the first location information to the emergency organization communication apparatus when there is a call from the wireless terminal; and the femto base station transmitting the SIP message to another apparatus.

A recording medium according to an exemplary aspect of the invention is a computer-readable recording medium storing a program causing a computer of a femto base station arranged in a communication system connected to a public communication network including an emergency organization communication apparatus to execute, the recording medium storing a program causing the computer to execute a first communication control process of attaching first location information, which is information for identifying a location of a femto base station or for identifying a location of an assembly of a plurality of base stations including the femto base station, to a SIP message in order to notify the first location information to the emergency organization communication apparatus when there is a call from the wireless terminal, and of transmitting the SIP message to another apparatus.

BRIEF DESCRIPTION OF DRAWINGS

FIG. 1 is a block diagram showing a system configuration example based on an existing 3G network.

FIG. 2 is a diagram showing a flow of location information transmission in the existing 3G network.

FIG. 3 is a diagram showing a format example of SAI.

FIG. 4 is a diagram showing a format example of GEOarea.

FIG. 8 is a diagram showing a flow of location information transmission in a communication system as an exemplary embodiment.

FIG. 9 is a sequence diagram showing a communication operation in a communication system as an exemplary embodiment.

DESCRIPTION OF EMBODIMENTS

Next, an exemplary embodiment applied with a communication system, a femto base station, a call session control server, a home subscriber server, a communication method, and a communication program according to the present invention will be described in detail with reference to the drawings.

The present exemplary embodiment illustrates a preferred example, in which a femto base station (Femto AP; Femto Access Point) performs an operation for connecting a call to UE which is a wireless terminal, and location information is used within a range defined in a specification such as 3GPP to allow making a call to an emergency organization.

Figure 5:
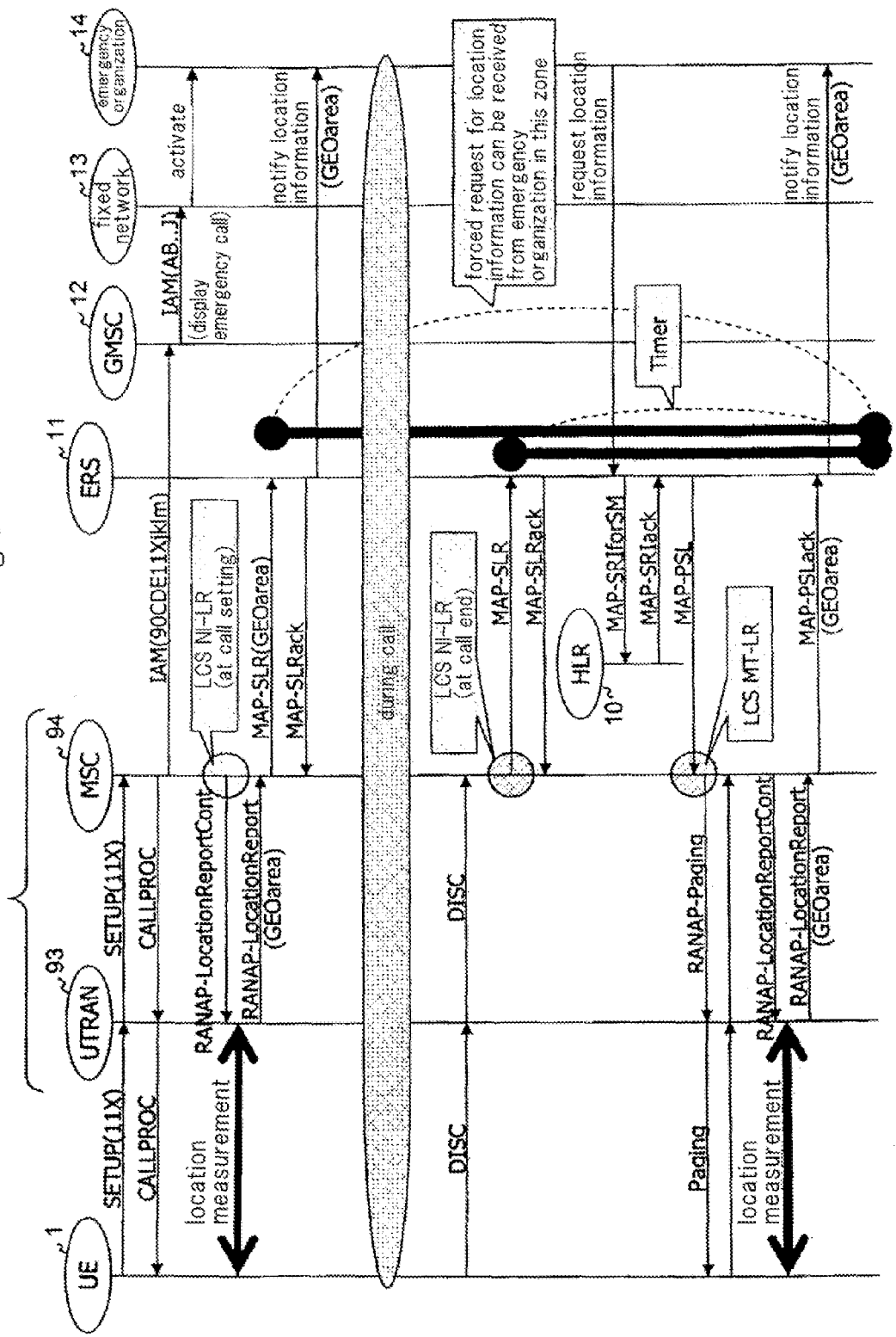
FIG. 5 is a sequence diagram showing a communication operation in the existing 3G network.
Figure 6:
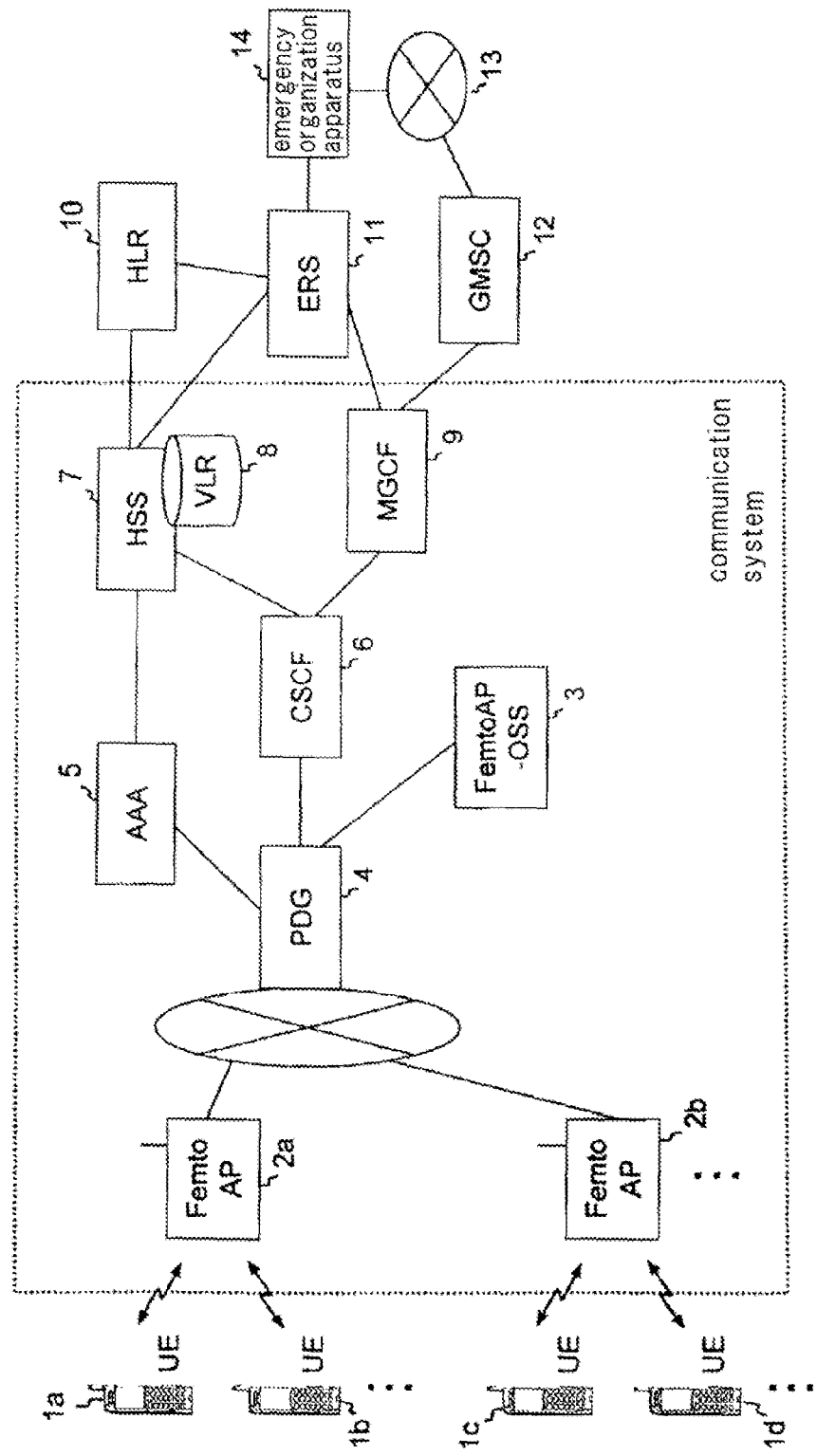
FIG. 6 is a block diagram showing a configuration example of a communication system as an exemplary embodiment.

As shown in FIG. 6, communication system 1 of the present exemplary embodiment is connected to HLR 10, ERS 11, and GMSC 12. Communication system 1 of the present exemplary embodiment includes Femto AP 2 that constructs a predetermined communication area, Femto AP-OSS (Operation Support System) 3, PDG (Packet Data Gateway) 4 that connects to each Femto AP 2 through a network, AAA (Authentication Authorisation Accounting) 5, call session control server (CSCF; Call Session Control Function) 6, home subscriber server (HSS) 7, and media gateway control server (MGCF; Media Gateway Control Function) 9. The configurations will be described below.

Figure 7A:
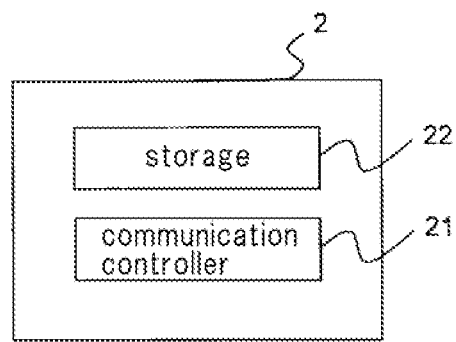
FIG. 7A is a block diagram showing a configuration example of a femto base station of the present exemplary embodiment.

FIG. 7A is a block diagram showing a configuration example of Femto AP of the present exemplary embodiment.

Femto AP 2 (described as Femto APs 2*a* and 2*b* in FIG. 6) is a small wireless base station that covers a narrow communication area of about several dozen meters in radius. As shown in FIG. 7A, Femto AP 2 includes communication controller 21 and storage 22. Storage 21 stores SAI. When receiving a connection request from UE 1, communication controller 21 attaches SAI to a SIP message, SAI indicating the location of a base station of Femto AP 2 or the location of an assembly of a plurality of base stations including the base station of Femto AP 2, and transmits SAI to another apparatus. The SIP message is, for example, INVITE. The apparatus that receives the SIP message is, for example, CSCF 6.

Femto AP-OSS 3 is an apparatus for setting or monitoring Femto AP 2 through a network.

PDG 4 is an apparatus that relays a message.

AAA 5 is an apparatus that executes an authentication process, etc., of UE 1.

Figure 7B:
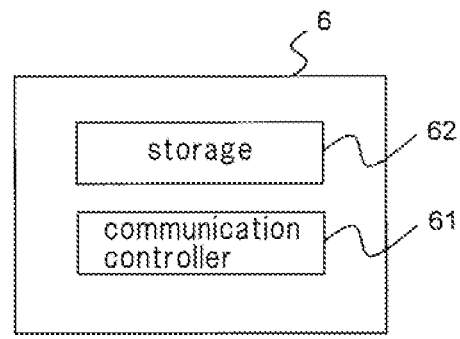
FIG. 7B is a block diagram showing a configuration example of a call session control server of the present exemplary embodiment.

FIG. 7B is a block diagram showing a configuration example of CSCF of the present exemplary embodiment.

As shown in FIG. 7B, CSCF 6 includes communication controller 61 and storage 62. Storage 62 stores a conversion table. The conversion table is a table in which a predetermined phone number, such as an emergency telephone number 110 or 119, is registered in association with a phone number allocated in advance in accordance with location information based on SAI, to perform above-described phone number conversion. Communication controller 61 includes functions of session control, management, authentication, routing, etc., using SIP (Session Initiation Protocol).

When receiving the SIP INVITE message including SAI from Femto AP 2, communication controller 61 determines whether the phone number included in the SIP INVITE message is included in the conversion table. If the phone number is included in the conversion table, communication controller 61 converts the phone number into a called party's phone number based on the conversion table and transmits the converted called party's phone number to MGCF 9 by using a SIP INVITE message.

After receiving the SIP INVITE message including SAI from Femto AP 2, if the phone number included in the SIP INVITE message is included in a number group predetermined in the conversion table, communication controller 61 transmits, to HSS 7 and by using a DIAMETER message, a location information transfer request for HSS 7 to transfer GEOarea to ERS 11. When receiving a SIP BYE message from Femto AP 2, communication controller 61 transfers a call end notification to HSS 7 by using a DIAMETER message.

Figure 7C:
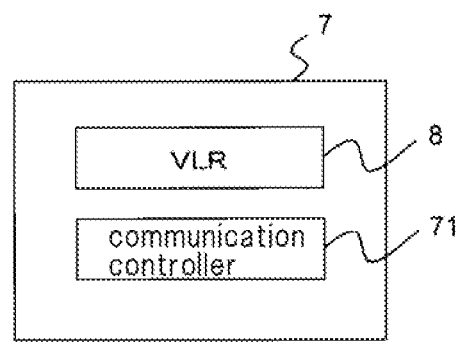
FIG. 7C is a block diagram showing a configuration example of a home subscriber server of the present exemplary embodiment.

FIG. 7C is a block diagram showing a configuration example of HSS of the present exemplary embodiment.

As shown in FIG. 7C, HSS 7 includes communication controller 71 and VLR (Visitor Location Register) 8 and manages subscriber information of UE 1. Communication controller 71 acquires the subscriber information of UE 1 from HLR 10 and stores and manages the acquired subscriber information of UE 1 in VLR 8. HSS 7 has a MAP GW (MAP Gateway) function.

During the authentication of UE 1, communication controller 71 associates GEOarea, which includes the longitude/latitude information of UE 1 received from Femto AP 2 connected to UE 1, with base station identification information, which is information for identifying Femto AP 2, and stores GEOarea in VLR 8.

After receiving a call end notification from CSCF 6, if a location information request is received from ERS 11 within a predetermined time, communication controller 71 transmits GEOarea stored in VLR 8 to ERS 11.

MGCF 9 includes a function for interconnecting the communication system as the present exemplary embodiment with an existing telephone network and provides a function for controlling MGW (media gateway) not shown, etc.

Next, the flow of transmission of location information used in a call for an emergency organization communication apparatus, etc., in the communication system as the present exemplary embodiment will be described with reference to FIG. 8.

First, during the installation of Femto AP 2, an operator of the system operates Femto AP-OSS 3 and performs default setting of Femto AP 2. In the default setting, Femto AP-OSS 3 sets and registers SAI (first location information) and GEOarea (second location information) in Femto AP 2 and stores SAI and GEOarea in storage 22. A LAC value in SAI may be determined from, for example, the installed location of Femto AP 2. A SAC value may be uniquely provided for each Femto AP, for example. GEOarea is determined by the installed location of Femto AP 2.

When there is a call from UE 1, Femto AP 2 transmits GEOarea to CSCF 6 during the authentication request (Registration) of SIP and transmits SAI to CSCF 6 by using a SIP INVITE message.

In consideration of the difference in the data length, it is preferable to store SAI in a predetermined area in the header of the SIP message and store GEOarea in a predetermined area in the body of the SIP message.

If the counterpart number indicating the phone number of the counterpart transmitted from UE 1 is included in the conversion table as a target of the phone number conversion, CSCF 6 uses the conversion table to perform the phone number conversion to the counterpart number, converts the counterpart number from UE 1 to a called party's phone number, and connects a call to the converted called party's phone number.

HSS 7 associates GEOarea received from UE 1 during Registration of SIP with the base station identification information for identifying Femto AP 2 connected to the caller and stores GEOarea in VLR 8. HSS 7 further uses a MAP message to transmit SAI to HLR 10 by a MAP GW function. During the call for the emergency organization, HSS 7 transmits GEOarea to ERS 11 and causes ERS 11 to transmit GEOarea to emergency organization communication apparatus 14.

Next, an operation of UE 1 calling an emergency organization communication apparatus based on the communication system as the present exemplary embodiment will be described with reference to FIG. 9.

In response to a call from UE 1, Femto AP 2 issues an authentication request (Registration) to HSS 7 and transmits preset GEOarea to HSS 7 by using a message of Registration. HSS 7 associates GEOarea with the base station identification information for identifying Femto AP 2 of the sender and stores GEOarea in VLR 8.

As in the case of the existing 3G network, when a connection request (SETUP) is transferred from UE 1, Femto AP 2 transmits CALLPROC to UE 1 as a reply and attaches SAI to a SIP INVITE message to transmit SAT to CSCF 6.

In the transmission of SAI, as described, it is preferable that SAI be attached to a predetermined area in the header of a SIP INVITE message.

When the SIP INVITE message attached with SAI is received from Femto AP 2, CSCF 6 checks whether the phone number included in the INVITE message is included in the number group of the conversion table as a target of the phone number conversion. If the received phone number is included in the conversion table, CSCF 6 uses the conversion table to convert the phone number into the called party's phone number in accordance with SAI and transmits the SIP INVITE message including information of the called party's phone number to MGCF 9.

MGCF 9 transmits an IAM message as in the case of the existing 3G network to GMSC 12 and performs call control of emergency organization communication apparatus 14, having the converted called party's phone number, through fixed network 13.

After transmitting the SIP INVITE message to MGCF 9, CSCF 6 transmits a transfer request of location information to HSS 7 by using a DIAMETER message.

When receiving the transfer request of location information from CSCF 6, HSS 7 transmits GEOarea to ERS 11 by using a MAP message as in the case of the existing 3G network and causes ERS 11 to transmit GEOarea to emergency organization communication apparatus 14. In this way, a call between UE 1 and emergency organization communication apparatus 14 starts.

When the end of the call (DISC) is transmitted from UE 1 to Femto AP 2, Femto AP 2 transmits a SIP BYE message to CSCF 6. CSCF 6 transmits the end of the call to HSS 7 by using a DIAMETER message. When receiving the notification of the end of the call, HSS 7 transmits the call end notification to ERS 11 by using a MAP message as in the case of the existing 3G network.

After the end of the call, if emergency organization communication apparatus 14 transmits a location information request to ERS 11 before an elapse of time predetermined by Timer of ERS 11, ERS 11 inquires of HLR 10 for an acquisition location for acquiring location information of UE as a request target of location information by using a MAP message. ERS 11 transmits, by using a MAP message, a location information request to HSS 7 that is identified based on a reply to the inquiry.

When receiving the location information request, HSS 7 transmits GEOarea of relevant Femto AP 2 stored in VLR 8 to ERS 11 by using a MAP message and causes ERS 11 to transmit GEOarea to emergency organization communication apparatus 14.

Although other apparatuses not shown also perform controls in the call control, etc., the controls are predetermined by specifications such as 3GPP and are not directly related to the characteristics of the present invention. Therefore the description will be omitted.

As described, according to the exemplary embodiment, at least SAI or GEOarea is embedded in a predetermined area of a SIP message, and a femto cell is used within a range defined by a 3GPP standard to realize a communication system corresponding to a call for an emergency organization communication apparatus based on location information as in an existing 3G network.

Furthermore, the communication system using the femto cell can be installed without modifications to the existing 3G network.

Even if a location information request is transferred from emergency organization communication apparatus 14 after a call end process by UE 1, HSS 7 transfers GEOarea of relevant Femto AP 2 stored in VLR 8. Therefore, the location does not have to be measured again, and unnecessary processes can be reduced.

The exemplary embodiment is a preferred exemplary embodiment of the present invention. The present invention is not limited to the exemplary embodiment, but can be implemented with various changes based on the technical concept of the present invention.

For example, the "system" in the present specification denotes a logical assembly of a plurality of apparatuses (or functional modules that realize specific functions), and whether the apparatuses and functional modules are in a single casing does not particularly matter.

In particular, CSCF and MGCF realize predetermined functions, and whether the configurations realizing the functions are in a single casing does not particularly matter.

Furthermore, programs of processing procedures for realizing the femto base station, the call session control server, and the home subscriber server in the exemplary embodiment can be recorded in a recording medium, and the functions of the exemplary embodiment can be realized by causing a CPU (Central Processing Unit) of a computer included in the system to execute the processes based on the programs supplied from the recording medium. The CPU is arranged in, for example, a communication controller in each of the femto base station, the call session control server, and the home subscriber server.

In that case, the present invention is also applied when the recording medium or an external recording medium through a network supplies an information group including the programs to an output apparatus.

Therefore, program codes read out from the recording medium realize new functions of the present invention, and the recording medium storing the program codes and signals read out from the recording medium constitute the present invention.

Examples of the recording medium include a flexible disk, a hard disk, an optical disk, a magneto-optical disk, a CD-ROM, a CD-R, a CD-RW, a DVD-ROM, a DVD-RAM, a DVD-RW, a DVD+RW, a magnetic tape, a non-volatile memory card, and ROM.

According to the programs of the present invention, the functions of the exemplary embodiment can be realized in the femto base station, the call session control server, and the home subscriber server that is controlled by the programs.

According to an example of the advantages of the present invention, the femto base station can be used to make a call for an emergency organization communication apparatus based on the location information as in the existing public mobile communication network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is the National Phase of PCT/JP2009/071250, filed Dec. 21, 2009, which is based upon and claims the benefit of priority from Japanese Patent Application No. 2008-333646 filed on Dec. 26, 2008, the content of which is incorporated by reference.

DESCRIPTION OF SYMBOLS

1 UE
2, 2a, 2b Femto AP
3 FemtoAP-OSS
4 PDG
5 AAA
6 CSCF
7 HSS
8 VLR
9 MGCF
10 HLR
11 ERS
12 GMSC
13 Fixed network
14 Emergency organization communication apparatus
91 Node-B
92 RNC
93 UTRAN
94 MSC
95 VLR

The invention claimed is:
1. A communication system connected to a public communication network including an emergency organization communication apparatus, said communication system comprising:
a femto base station wirelessly connected to a wireless terminal;
a call session control server;
a media gateway control server; and
a home subscriber server, wherein
each of said femto base station, said call session control server, and said media gateway control server performs call control by using a SIP message,
wherein, said femto base station comprises a first communication controller attaching first location information, which is information for identifying a location of a femto base station or for identifying a location of an assembly of a plurality of base stations including said femto base station, to a SIP message in order to notify said first location information to said emergency organization communication apparatus when there is a call from said wireless terminal, and transmitting said SIP message to said call session control server, and said first communication controller issuing an authentication request to said home subscriber server when there is said call from said wireless terminal and transmitting second location information, which is information including longitude/latitude information of said wireless terminal, to said home subscriber server,
wherein, said call session control server comprises:
a conversion table associating a predetermined phone number with a predetermined called party's phone number in accordance with said first location information; and
a second communication controller, when receiving a SIP INVITE message including said first location information from said femto base station, if a phone number included in said SIP INVITE message is included in said conversion table, converting said phone number into said called party's phone number based on said conversion table, and transmitting said converted called party's phone number to said media gateway control server by using said SIP INVITE message,
wherein, said home subscriber server comprises:
a visitor location register storing said second location information in association with base station identification information which is information for identifying said femto base station; and
a third communication controller storing said second location information, which is received from said femto base station connected to said wireless terminal during authentication of said wireless terminal, in said visitor location register in association with said base station information,
wherein, when said SIP INVITE message is received from said call session control server, said media gateway control server performs call control of said emergency organization communication apparatus through said public communication network,
wherein, when a SIP BYE message based on an end of said call that is transmitted from said wireless terminal, is received from said femto base station, said second communication controller transfers a call end notification to said home subscriber server by using a DIAMETER message,
wherein, said third communication controller transmits said second location information stored in said visitor location register to an emergency organization server connected to said emergency organization communication apparatus, if a location information request is received from said emergency organization server within a predetermined time after receiving said call end notification from said call session control server, wherein, said femto base station is a wireless base station that covers a communication area which is narrower than a communication area of a macro cell.

2. The communication system according to claim 1, wherein said first communication controller attaches said first location information to a predetermined area in said SIP INVITE message and transmits said SIP INVITE message to said call session control server.

3. The communication system according to claim 1, wherein when said SIP INVITE message including said first location information is received from said femto base station, if a phone number included in said SIP INVITE message is included in a number group predetermined in said conversion table, said second communication controller transmits a location information transfer request to said home subscriber server by using a DIAMETER message in order to cause said home subscriber server to send said second location information to emergency organization communication apparatus.

4. The communication system according to claim 1, wherein
if said wireless terminal freely moves within said communication area of the femto base station after said authentication, said emergency organization server will identify a location of said wireless terminal based on said second location information which is received from said home subscriber server.

5. The communication system according to claim 1, wherein said first location information is SAI (Service Area Identification) which is predetermined by 3GPP (3rd Generation Partnership Project) and said second location information is GEOarea (Geographical Area) which is predetermined by said 3GPP.

6. A communication method in a communication system that is connected to a public communication network including an emergency organization communication apparatus and that includes a femto base station, said communication method comprising:
said femto base station attaches first location information, which is information for identifying a location of a femto base station or for identifying a location of an assembly of a plurality of base stations including said femto base station, to a SIP message in order to notify said first location information to said emergency organization communication apparatus when there is a call from a wireless terminal;
said femto base station transmits said SIP message to a call session control server arranged in said communication system;
said femto base station issues an authentication request to a home subscriber server arranged in said communication system when there is said call from said wireless terminal, and transmits second location information, which is information including longitude/latitude information of said wireless terminal, to said home subscriber server;
when a SIP INVITE message including said first location information is received from said femto base station, said call session control server refers to a conversion table storing a predetermined phone number in association with a predetermined called party's phone number in accordance with said first location information, and if a phone number included in said SIP INVITE message is included in said conversion table, said call session control server converts said shone number into said called party's phone number based on said conversion table, and transmits said converted called party's phone number to a media gateway control server arranged in said communication system by using SIP INVITE message;
when said SIP INVITE message is received from said call session control server, said media gateway control server performs call control of said emergency organization communication apparatus through said public communication network;
said home subscriber server stores said second location information received from said femto base station connected to said wireless terminal during authentication of said wireless terminal, in a visitor location register in association with base station identification information, which is information for identifying said femto base station;
when a SIP BYE message based on an end of said call that is transmitted from said wireless terminal, is received from said femto base station, said call session control server transfers a call end notification to said home subscriber server by using a DIAMETER message; and
said home subscriber server transmits said second location information stored in said visitor location register to an emergency organization server connected to said emergency organization communication apparatus, if a location information request is received from said emergency organization server within a predetermined time after receiving said call end notification from said call session control server,
wherein, said femto base station is a wireless base station that covers a communication area which is narrower than a communication area of a macro cell.

7. The communication method according to claim 6, wherein said femto base station attaches said first location information to a predetermined area in said SIP INVITE message to transmit said SIP INVITE message to said call session control server.

8. The communication method according to claim 6, wherein said call session control server receives said SIP INVITE message including said first location information from said femto base station, and if a phone number included in said SIP INVITE message is included in a number group predetermined in said conversion table, transmits a location information transfer request to said home subscriber server by using a DIAMETER message in order to cause said home subscriber server to send said second location information to emergency organization communication apparatus.

9. The communication method according to claim 6, wherein if said wireless terminal freely moves within said communication area of the femto base station after said authentication, said emergency organization server will identify a location of said wireless terminal based on said second location information which is received from said home subscriber server.

10. The communication method according to claim 6, wherein said first location information is SAI (Service Area Identification) which is predetermined by 3GPP (3rd Generation Partnership Project) and said second location information is GEOarea (Geographical Area) which is predetermined by 3GPP.

* * * * *